United States Patent
Jing

(10) Patent No.: US 10,402,572 B2
(45) Date of Patent: Sep. 3, 2019

(54) METHOD AND APPARATUS FOR SELECTING MODE OF TERMINAL

(71) Applicant: HUAWEI TECHNOLOGIES CO., LTD., Shenzhen (CN)

(72) Inventor: Hao Jing, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 277 days.

(21) Appl. No.: 15/313,536

(22) PCT Filed: May 29, 2014

(86) PCT No.: PCT/CN2014/078819
§ 371 (c)(1),
(2) Date: Nov. 22, 2016

(87) PCT Pub. No.: WO2015/180103
PCT Pub. Date: Dec. 3, 2015

(65) Prior Publication Data
US 2017/0200014 A1     Jul. 13, 2017

(51) Int. Cl.
*G06F 21/60*     (2013.01)
*H04M 1/725*     (2006.01)
(Continued)

(52) U.S. Cl.
CPC .......... *G06F 21/60* (2013.01); *H04M 1/7253* (2013.01); *H04W 12/08* (2013.01); *G06F 21/34* (2013.01);
(Continued)

(58) Field of Classification Search
CPC .................................................... G06F 21/00
See application file for complete search history.

(56) References Cited

U.S. PATENT DOCUMENTS

| 2004/0041693 A1* | 3/2004 | Matsubara | B60R 25/24 340/5.72 |
| 2005/0092787 A1* | 5/2005 | Stokes | A47G 25/442 223/94 |

(Continued)

FOREIGN PATENT DOCUMENTS

| CN | 101141722 A | 3/2008 |
| CN | 101237479 A | 8/2008 |

(Continued)

OTHER PUBLICATIONS

European Search Report dated Apr. 10, 2017 in the corresponding European Application No. 14893515.8.

(Continued)

*Primary Examiner* — Josnel Jeudy
(74) *Attorney, Agent, or Firm* — Kilpatrick Townsend & Stockton, LLP

(57) ABSTRACT

Embodiments of the present invention disclose a method and an apparatus for selecting a terminal mode, and the method includes: reading configuration information when a screen wakeup instruction is obtained, where the configuration information includes information about a wearable device that is paired with the terminal; querying to determine whether a wearable device is connected to a terminal; and selecting a mode corresponding to the wearable device as the terminal model if the wearable device that is connected to the terminal as determined by the querying is the same as the paired wearable device. In this solution, a corresponding mode can be selected according to a connection status between a terminal and a wearable device, thereby enhancing an automation degree of the terminal and improving a user experience effect.

21 Claims, 3 Drawing Sheets

(51) Int. Cl.
*H04W 12/08* (2009.01)
*H04W 4/80* (2018.01)
*G06F 21/34* (2013.01)
*G06F 21/74* (2013.01)

(52) U.S. Cl.
CPC ......... *G06F 21/74* (2013.01); *H04M 1/72516* (2013.01); *H04W 4/80* (2018.02)

(56) References Cited

U.S. PATENT DOCUMENTS

| | | |
|---|---|---|
| 2005/0186936 A1 | 8/2005 | Shih |
| 2007/0032337 A1* | 2/2007 | Schuler ................ B60N 2/0232 475/331 |
| 2008/0293453 A1 | 11/2008 | Atlas et al. |
| 2011/0106954 A1* | 5/2011 | Chatterjee ............. G06F 1/1632 709/227 |
| 2012/0015629 A1 | 1/2012 | Olsen et al. |
| 2012/0214416 A1 | 8/2012 | Kent et al. |
| 2012/0258692 A1 | 10/2012 | Luk |
| 2013/0086956 A1* | 4/2013 | Nave ...................... E05B 67/00 70/20 |
| 2013/0111345 A1* | 5/2013 | Newman ............... G06F 1/3265 715/716 |
| 2013/0111415 A1* | 5/2013 | Newman ............... G06F 1/3203 715/864 |
| 2013/0324081 A1 | 12/2013 | Gargi et al. |
| 2014/0155031 A1* | 6/2014 | Lee ........................ G06F 21/35 455/411 |
| 2014/0156319 A1* | 6/2014 | Deeb ..................... G06Q 30/06 705/5 |
| 2014/0181958 A1* | 6/2014 | Nosack .................. G06F 21/32 726/19 |
| 2014/0325614 A1 | 10/2014 | Rhelimi |
| 2014/0357318 A1 | 12/2014 | Li |
| 2016/0252969 A1* | 9/2016 | Lee ....................... G06F 3/0488 345/156 |
| 2016/0297400 A1* | 10/2016 | Krishnan .............. B60R 25/241 |
| 2017/0200014 A1* | 7/2017 | Jing ..................... H04M 1/7253 |
| 2017/0262624 A1* | 9/2017 | Yan ..................... G06F 3/04883 |

FOREIGN PATENT DOCUMENTS

| | | |
|---|---|---|
| CN | 102568184 A | 7/2012 |
| CN | 103445409 A | 12/2013 |
| CN | 103473514 A | 12/2013 |
| CN | 103714285 A | 4/2014 |
| WO | 2013078796 A1 | 6/2013 |
| WO | 2013079609 A1 | 6/2013 |

OTHER PUBLICATIONS

International Search Report dated Feb. 27, 2015 in the corresponding PCT Application No. PCT/CN2014/078819.

* cited by examiner

METHOD AND APPARATUS FOR SELECTING MODE OF TERMINAL

CROSS-REFERENCE TO RELATED APPLICATIONS

This application is a national stage of International Application No. PCT/CN2014/078819, filed on May 29, 2014, which is hereby incorporated by reference in its entirety.

TECHNICAL FIELD

The present invention relates to the field of electronic technologies, and in particular, to a method and an apparatus for selecting a terminal mode.

BACKGROUND

Currently, for a smart terminal such as a mobile phone, a mode of the mobile phone is mainly manually selected by a user on the mobile phone. Once a mode is selected, each person that uses this mobile phone obtains a same permission and views same content unless the user changes the mode of the mobile phone again. However, as the mobile phone may often need to be lent to others for use, this manner, of the prior art, in which a mode is relatively fixed once selected is unfavorable for protecting privacy content that is stored by the user in the mobile phone.

SUMMARY

In view of this, embodiments of the present invention provide a method and an apparatus for selecting a terminal mode, so as to solve a problem that in the prior art, user privacy is not well protected by selecting a mode in a manual manner. To achieve the foregoing objective, the following technical solutions are used in the embodiments of the present invention:

According to a first aspect, a method for selecting a terminal mode is provided and includes: querying to determine whether a wearable device is connected to a terminal; determining whether the wearable device that is connected to the terminal as determined by the querying is the same as a paired wearable device; selecting a first mode as the terminal model when the wearable device that is connected to the terminal as determined by the querying is the same as the paired wearable device; and selecting a second mode as the terminal model when the wearable device that is connected to the terminal as determined by the querying is different from the paired wearable device.

With reference to the first aspect, in a first possible implementation manner of the first aspect, the first mode includes any one the following unlocking manners: sliding to unlock, double-tapping to unlock, and direct unlocking; and the second mode includes any one the following unlocking manners: fingerprint unlocking, password unlocking, iris unlocking, graph and pattern unlocking, face unlocking, PIN unlocking, voice unlocking, sound wave unlocking, and gesture unlocking.

With reference to the first aspect, in a second possible implementation manner of the first aspect, the first mode includes any one of an owner interface, an owner desktop, and an owner contacts list; and the second mode includes any one of a guest interface, a guest desktop, and a guest contacts list.

With reference to the first aspect, and the first or second possible implementation manner of the first aspect, in a third possible implementation manner: after the selecting a second mode as the terminal model when the wearable device that is connected to the terminal as determined by the querying is different from the paired wearable device, the method further includes: acquiring, by the terminal, a sound signal transmitted by a wearable device, determining whether the sound signal meets a set condition, and transmitting, by the terminal, alert information when the sound signal does not meet the set condition.

With reference to the third possible implementation manner of the first aspect, in a fourth possible implementation manner: the transmitting alert information includes transmitting an alert sound, or sending information about the terminal to a specific object, where the specific object includes a mobile phone, an email box, and a social account of the terminal user or another user; and the information about the terminal includes a position and a status of the terminal.

With reference to the first aspect, in a fifth possible implementation manner of the first aspect, the connection includes any connection manner of a Bluetooth connection, a WiFi connection, or an NFC connection.

According to a second aspect, an apparatus for selecting a terminal mode is provided, and the apparatus includes: a querying unit, configured to query whether a wearable device is connected to a terminal; a determining unit, configured to determine whether the wearable device that is connected to the terminal as determined by the querying is the same as a paired wearable device; and a selecting unit, configured to select a first mode as the terminal model when the wearable device that is connected to the terminal as determined by the querying is the same as the paired wearable device, and select a second mode as the terminal model when the wearable device that is connected to the terminal as determined by the querying is different from the paired wearable device.

With reference to the second aspect, in a first possible implementation manner of the second aspect, the first mode includes any one the following unlocking manners: sliding to unlock, double-tapping to unlock, and direct unlocking; and the second mode includes any one the following unlocking manners: fingerprint unlocking, password unlocking, iris unlocking, graph and pattern unlocking, face unlocking, PIN unlocking, voice unlocking, sound wave unlocking, and gesture unlocking.

With reference to the second aspect, in a second possible implementation manner of the second aspect, the first mode includes any one of an owner interface, an owner desktop, and an owner contacts list; and the second mode includes any one of a guest interface, a guest desktop, and a guest contacts list.

With reference to the second aspect, and the first or second possible implementation manner of the second aspect, in a third possible implementation manner, the apparatus further includes: an audio acquiring unit, configured to acquire a sound signal transmitted by a wearable device; a first determining unit, configured to determine whether the acquired sound signal meets a set condition; and an alerting unit, configured to transmit alert information when the sound signal does not meet the set condition.

The embodiments of the present invention provide a method and an apparatus for selecting a terminal mode. By using the method provided in the embodiments of the present invention, it is queried whether a wearable device is connected to a terminal; a first mode is selected when a result of the querying includes a paired wearable device; and a second mode is selected when the result of the querying does not include a paired wearable device, thereby enhancing a function of automatically switching the terminal model and facilitating protection of user privacy.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes some technical solutions provided in various embodiments of the present invention with reference to the accompanying drawings in the embodiments of the present invention. Apparently, the described embodiments are merely some but not all of the embodiments of the present invention. All other embodiments obtained by persons of ordinary skill in the art based on the disclosed embodiments without creative efforts shall fall within the protection scope of the present invention.

A terminal described in the embodiments of the present invention can include a mobile phone, a tablet computer (Tablet Personal Computer), a laptop computer (Laptop Computer), and the like.

A wearable device described in the embodiments of the present invention can include a smart watch, a sports bracelet, smart glasses, and the like.

Figure 1:
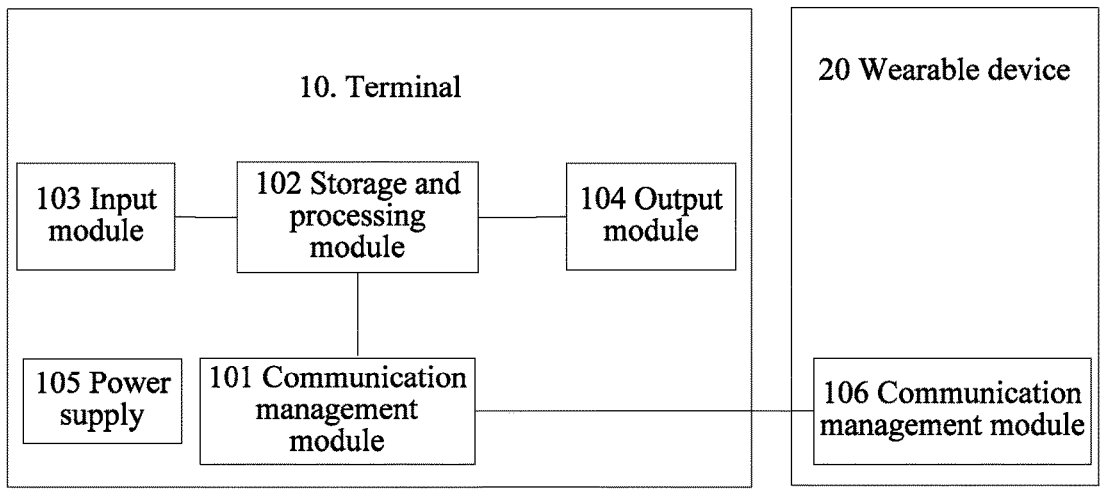
FIG. 1 is a structural diagram of an application scenario according to an embodiment of the present invention.

Illustratively, FIG. 1 shows a structural diagram of an application scenario that is used to implement a method provided in an embodiment of the present invention. The terminal 10 includes components such as a communication management module 101, a storage and processing module 102, an input module 103, an output module 104, and a power supply 105. It can be understood that, inside a wearable device 20, at least a communication management module 106 is included. In addition, the wearable device 20 may also include all or a part of the foregoing modules or power supply.

The input module 103 is configured to implement interaction between a user and a terminal and/or information input to the terminal. For example, the input module 103 may receive digit or character information that is input by the user, so as to generate signal input related to user settings or function control. In one implementation, the input module 103 may be a touch control panel, may also be another human-machine interaction interface such as a physical input key or a microphone, and may further be another external information capture apparatus such as a camera. A touch control panel, also referred to as a touchscreen or a touch control screen, can collect an operation action, by the user, of a touch on or an approach to the touch control panel, for example, an operation action that is performed by the user by using any appropriate article or accessory such as a finger or a touchpen on the touch control panel or at a position close to the touch control panel, and can drive a corresponding connecting apparatus according to a preset program. Optionally, the touch control panel may include two parts: a touch detecting apparatus and a touch controller. The touch detecting apparatus detects a touch operation of a user, coverts the detected touch operation into an electrical signal, and transfers the electrical signal to the touch controller; and the touch controller receives the electrical signal from the touch detecting apparatus, converts the electrical signal into contact coordinates, and then transfers the contact coordinates to a processing unit in the storage and processing module. The touch controller may further receive and execute a command sent from the processing unit. In addition, the touch control panel may be implemented in multiple types such as a resistor type, a capacitor type, an infrared (Infrared) type, and a surface acoustic wave type. In another implementation manner of the present invention, the physical input key used by the input module may include but is not limited to one or more of a physical keyboard, a function key (such as a volume control key or an on/off key), a trackball, a mouse, an operating lever, and the like. The input module in a form of a microphone can collect a voice that is input by the user or an environment, and convert the voice into a command that is in a form of an electrical signal and can be executed by the processing unit.

In some other implementations, the input module 103 may further be various types of sensing components, for example, a Hall component, which is configured to detect a physical quantity, such as a force, a torque, pressure, a stress, a position, a displacement, a speed, an acceleration, an angle, an angular velocity, a quantity of revolutions, a speed of revolution, or a time at which a working status changes, of the mobile terminal, and converts the physical quantity into power to perform detection and control. Some other sensing components may further include a gravity sensor, a tri-axis accelerometer, a gyroscope, and the like.

The storage and processing module 102 is a control center of the terminal and connects all parts of the entire terminal by using various interfaces and lines. The storage and processing module 102 runs or executes a software program and/or a module that are/is stored in a storage unit, and invokes data stored in the storage unit, so as to implement various functions of the mobile terminal and/or process data. The storage and processing module 102 includes an integrated circuit (Integrated Circuit, IC for short); for example, the storage and processing module 102 may consist of a single packaged IC, or may be formed by connecting multiple packaged ICs of a same function or different functions. For example, the storage and processing module 102 may include a central processor (Central Processing Unit, CPU for short) only, or may be a combination of a GPU, a digital signal processor (Digital Signal Processor, DSP for short), and a control chip (such as a baseband chip) in the communication management module. In this implementation manner of the present invention, the CPU may be a single computing core, or may include multiple computing cores.

The storage and processing module 102 may be further configured to store software program settings and system settings, and the storage and processing module 102 reads software program configurations and system configurations that are stored in the storage and processing module 102, so as to implement various function applications of the mobile terminal and implement data processing. The storage and processing module 102 includes a program settings storage area and a system settings storage area. The program configurations storage area may store configuration information of at least one application program such as a sound playback program or an image playback program; and the system storage area can store system configuration data that is created according to use of the mobile terminal. In one implementation, the storage and processing module 102 may include a volatile memory such as a nonvolatile random access memory (Nonvolatile Random Access Memory, NVRAM for short), a phase change RAM (Phase Change RAM, PRAM for short), or a magetoresistive RAM (Magetoresistive RAM, MRAM for short), and may further include a non-volatile memory such as at least one magnetic disk storage device, an electrically erasable programmable read-only memory (Electrically Erasable Programmable Read-Only Memory, EEPROM for short), or a flash memory such as a NOR flash memory (NOR flash memory) or a NAND flash memory (NAND flash memory). The non-volatile memory stores an operating system and an application program that are executed by the storage and processing module 102. The storage and processing module 102 loads a running program and data from the non-volatile memory to a memory and stores digital content in a storage apparatuses with a large capacity. The operating system includes various components and/or drivers that are used to control and manage regular system tasks such as memory management, control of a storage device, and power management and facilitate communication between various software and hardware. In this implementation manner of the present invention, the operating system may be an Android system of Google, an iOS system developed by Apple, a Windows operating system developed by Microsoft, or an embedded operating system such as Vxworks. This embodiment of the present invention constitutes no limitation on the operating system.

The communication management module 101 provides hardware, a driver, an application software environment, and an external interface that are required for communication, and various communication-based functions, and performs induction and interaction with a system by using a communication module. The communication management module may include communication modules such as a wireless local area network (Wireless Local Area Network, wireless LAN for short) module, a Bluetooth module, and a WiFi direct module, and a radio frequency (Radio Frequency, RF for short) circuit corresponding to the communication module. The communication management module is used to perform wireless local area network communication, Bluetooth communication, and infrared communication. The communication module is used to control communication between various components in the mobile terminal, and can support direct memory access (Direct Memory Access).

In different implementation manners of this embodiment of the present invention, each communication module in the communication management module 101 generally appears in a form of an integrated circuit chip (Integrated Circuit Chip), and may be combined selectively without a need of including all communication modules and a corresponding antenna group.

The output module 104 includes but is not limited to an image output module and a sound output module. The image output module is used to output text, a picture, and/or a video. The image output module may include a display panel, for example, a display panel configured in a form of an LCD (Liquid Crystal Display, liquid crystal display), an OLED (Organic Light-Emitting Diode, organic light-emitting diode), a field emission display (field emission display, FED for short), and the like. Alternatively, the image output module may include a reflective display such as an electrophoretic (electrophoretic) display or a display using interferometric modulation of light (Interferometric Modulation of Light). The image output module may include a single display or multiple displays of different sizes. In one implementation, a touch control panel used by the foregoing input module 103 may also be used as a display panel of the output module 104. For example, after detecting a gesture operation of a touch on or an approach to the touch control panel, the touch control panel transmits the gesture operation to the processing unit, so as to determine a type of a touch event, and then the processing unit provides corresponding visual output on the display panel according to the type of the touch event. In FIG. 1, the input module and the output module serve as two independent parts to implement input and output functions of the mobile terminal; however, in some embodiments, the touch control panel and the display panel may be integrated into one to implement the input and output functions of the mobile terminal. For example, the image output module may display various graphical user interfaces (Graphical User Interface, GUI for short), so that the various graphical user interfaces serve as a virtual control component for a user to perform an operation in a touch control manner, where the virtual control component includes but is not limited to a window, a scrollbar, an icon, and a scrapbook.

In one implementation, the image output module includes a filter and an amplifier and is used to filter and amplify a video that is output by the processing unit. The sound output module includes: a digital analog converter, which is used to convert a sound signal that is output by the processing unit from a digital format into an analog format, and a loudspeaker, which is used to output a sound, and the like. The sound signal created and propagated by the sound output module includes a sound, an ultrasonic wave, or any sound signal that can be modulated. When a sound signal is created, the sound signal may be generated in real time according to a specific algorithm, and may also be generated by using an existing audio file directly. The sound output module uses an audio card apparatus to transmit a sound signal.

The application program includes any application installed on the mobile terminal, and includes but is not limited to a browser, email, an instant message service, word processing, keyboard virtualization, a window widget (Widget), encryption, digital rights management, voice recognition, voice duplication, positioning (such as a function provided by the Global Positioning System), music playback, and the like.

The power supply 105 is used to supply power to different parts of the terminal to maintain running thereof. It is generally understood that, the power supply 105 may be a built-in battery such as a common lithium-ion battery or a nickel-hydride battery, and may also include an external power supply that directly supplies power to the mobile terminal, such as an AC adapter. In some implementation manners of the present invention, the power supply 105 may further be more widely defined. For example, the power supply 105 may further include a power management system, a charging system, a power fault detection circuit, a power converter or inverter, a power status indicator (such as a light emitting diode), and any other component that is related to power generation, management, and distribution of the mobile terminal.

Figure 2:
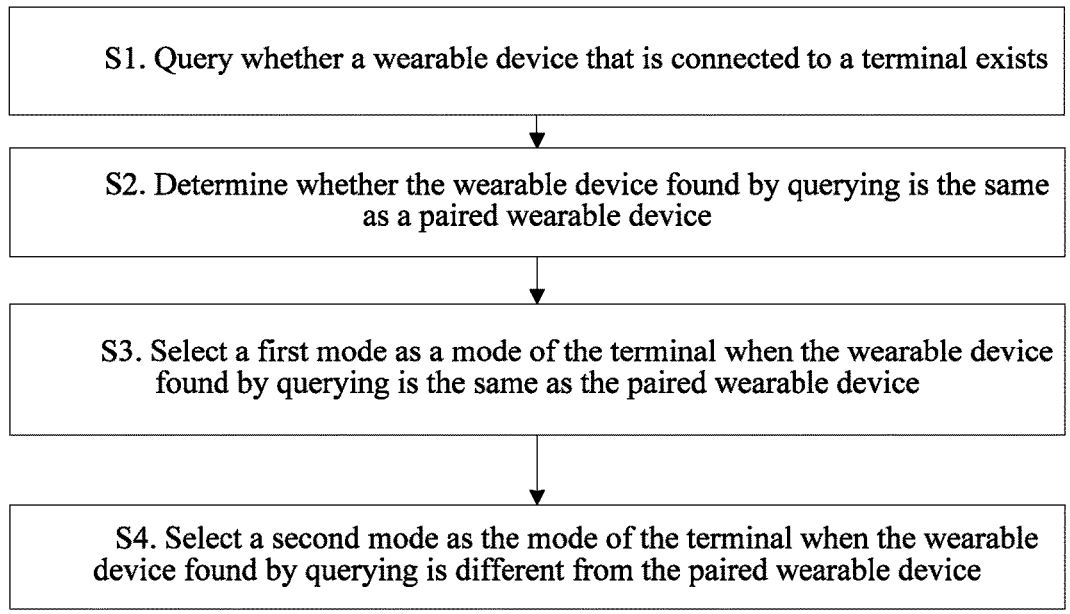
FIG. 2 is a flowchart of a method for selecting a terminal mode according to an embodiment of the present invention.

FIG. 2 is a flowchart of a method for selecting a terminal mode according to an embodiment of the present invention. The method is executed by the terminal. The following describes the method, provided in this embodiment of the present invention, for selecting the terminal model with reference to the accompanying drawing, and the method includes:

S1. Query to determine whether a wearable device is connected to a terminal. Optionally, a communication management module of the terminal establishes a connection to a communication management module of the wearable device, and the connection may be established between the wearable device and the terminal in a Bluetooth, WiFi, or NFC manner. A storage and processing module of the terminal queries and determines a connection status between the terminal and the wearable device. A manner of the foregoing querying to determine whether a wearable device is connected to a terminal is well known by a person skilled in the art, and is not described herein again.

Optionally, during hibernation, the terminal queries, at an interval (for example, 1 s or 2 s), whether a wearable device is connected to a terminal. Alternatively, when receiving a screen wakeup instruction, the terminal queries whether a wearable device is connected to a terminal. The screen wakeup instruction includes information that is used to wake up a screen; that is, before obtaining the screen wakeup instruction, the terminal is in a black-screen status such as a screen locking state, a hibernation state, and a standby state. The terminal invokes configuration information after obtaining the screen wakeup instruction, where the configuration information includes a screen wakeup manner, a screen wakeup condition, and the like. When the screen wakeup condition is met, the screen lights up.

A result of the querying includes a "connected" or "not connected" state between the wearable device and the terminal. For a connected wearable device, the result of the querying further includes a name and identity identification information of the wearable device, and the like. The terminal may establish a connection to at least one wearable device.

Optionally, a pattern, text, and the like of the connection status is displayed on a display screen, or a voice manner is used to notify a user of information about the connected state, so that the user obtains the connection status between the terminal and the wearable device or a change of the connection status.

S2. Determine whether the wearable device that is connected to the terminal as determined by the querying is the same as a paired wearable device.

It can be understood that, the foregoing determining whether the wearable device that is connected to the terminal as determined by the querying is the same as a paired wearable device includes determining whether the name or identity identification information of the wearable device that is connected to the terminal as determined by the querying is the same as a name or identity identification information of the paired wearable device.

S3. Select a first mode as the terminal model when the wearable device that is connected to the terminal as determined by the querying is the same as the paired wearable device.

Optionally, the first mode includes any one the following unlocking manners: sliding to unlock, double-tapping to unlock, and direct unlocking.

Optionally, the first mode includes at least one piece of the following content: an owner interface, an owner desktop, and an owner contacts list.

Optionally, different wearable devices correspond to a same first mode, or different wearable devices correspond to different modes. For example, when a first wearable device that is connected to the terminal exists, a first mode (1) such as horizontal sliding to unlock is selected; and when a second wearable device that is connected to the terminal exists, a first mode (2) such as vertical sliding to unlock is selected.

When different wearable devices correspond to different modes, in order to avoid disorder caused when multiple paired wearable devices are simultaneously found by querying, optionally, different priorities may be set for different wearable devices, and a selection sequence is selected according to the priorities. Alternatively, a selection sequence may be selected according to signal strength of the wearable devices. For example, when a first paired wearable device and a second paired wearable device are simultaneously found by querying, a preset priority of the first wearable device is higher than that of the second wearable device; therefore, a mode corresponding to the first wearable device is selected.

S4. Select a second mode as the terminal model when the wearable device that is connected to the terminal as determined by the querying is different from the paired wearable device.

It is understood that the wearable device that is connected to the terminal as determined by the querying is different from the paired wearable device may include one of the following: no wearable device is connected to the terminal as determined by the querying, or even if a wearable device is connected to the terminal as determined by the querying, the wearable device that is connected to the terminal as determined by the querying is different from the paired wearable device.

To protect user privacy, optionally, rights of the second mode are less than rights of the first mode. The rights include an unlocking manner, displayed content, management rights, and the like.

Optionally, the second mode includes one of complex unlocking manners, such as fingerprint unlocking, password unlocking, iris unlocking, graph and pattern unlocking, face unlocking, PIN unlocking, voice unlocking, sound wave unlocking, and gesture unlocking, so as to improve security of the terminal. Alternatively, a complex unlocking manner may not be used and the second mode includes only a part of an address book, a part of a historical chat record, a part of application programs, or the like. Alternatively, transmitting alert information is further included in the second mode, where the alert information includes transmitting an alert sound, or sending information about the terminal to a specific object, where the specific object includes a mobile phone, an email box, and a social account of the terminal user or another user; and the information about the terminal includes a position and a status of the terminal.

To further enhance security of the terminal, optionally, after selecting the second mode as the terminal model when the terminal cannot find, by querying, a paired wearable device, the method further includes the following: the terminal starts to acquire a sound signal transmitted by a wearable device, and the terminal sends out the alert information when no sound signal that meets a set condition is received. For example, the terminal first searches for a wearable device by using Bluetooth, and when no paired wearable device is found, it means that the terminal is perhaps not by the owner's side. In this case, to further verify whether the terminal is by the owner's side, optionally, the terminal starts to spontaneously acquire a sound signal transmitted by the wearable device, or the user operates the terminal to start to acquire a sound signal transmitted by the wearable device, where the sound signal may be a sound, an ultrasonic wave, an audio file, and the like. When the acquired sound signal transmitted by the wearable device meets a set condition, it means that a distance between the terminal and the wearable device is relatively close, where the set condition includes that the acquired sound signal is the same as a signal saved in the terminal, or a conformity degree between information such as a frequency or an amplitude of the acquired sound signal and that of the signal saved in the terminal is above 50% or 90% or any set value. When a sound signal transmitted by the wearable device cannot be acquired, the alert information is transmitted. It is understood that a sound signal transmitted by the wearable device cannot be acquired herein includes that no sound signal is acquired and that the acquired signal does not meet a set condition.

It can be understood that, when the wearable device and the terminal perform transmission in a Bluetooth, WiFi, or NFC manner, an effective distance between the wearable device and the terminal is limited by the transmission manner. That is, when the wearable device and the terminal are in a connected state, it means that the distance between the wearable device and the terminal is relatively close; and when the wearable device is out of an effective range of signal radiation of the terminal, the wearable device and the terminal are disconnected. When the owner carries the wearable device and the wearable device is relatively close to the terminal, the wearable device can establish a connection to the terminal; and when the owner carries the wearable device but the wearable device is very far from the terminal, the wearable device cannot establish a connection to the terminal. Therefore, the connection status between the wearable device and the terminal may be used to infer whether the owner is close to the terminal. Therefore, in this embodiment of the present invention, optionally, when the terminal is near the owner, a mode that has more rights or a simpler unlocking manner is selected as the terminal model, so as to increase convenience of the terminal. When the terminal is far from the owner and the wearable device cannot be connected to the terminal, a secure mode that has less rights or a more complex unlocking manner is selected as the terminal model, so as to improve security of the terminal. It should be noted that the foregoing setting method does not constitute a limitation on the technical solutions of the present invention, and this embodiment of the present invention does not limit content or a sequence of mode setting.

By using the method provided in this embodiment, a terminal queries whether a paired wearable device that is connected to the terminal exists, selects a first mode when a result of the querying includes the paired wearable device, and selects a second mode when the result of the querying does not include the paired wearable device, which eliminates a step of manual switching by a user and is favorable for enhancing a user experience effect.

Figure 3:
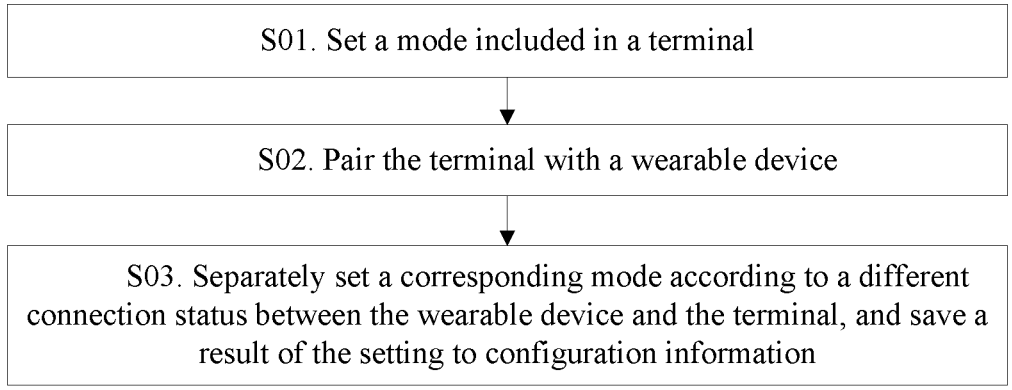
FIG. 3 is a flowchart of a method for setting terminal mode selection according to an embodiment of the present invention.

FIG. 3 is a flowchart of a method for setting terminal mode selection according to an embodiment of the present invention. The method is executed by a terminal. The following describes the method for setting terminal mode selection provided in this embodiment of the present invention with reference to the accompanying drawing, and the method includes:

S01. Set a mode included in the terminal. The mode includes any one or more items of content such as an unlocking manner, a desktop, a contacts list, and an application program.

Optionally, the foregoing mode includes a first mode and a second mode. The first mode includes a simple unlocking manner such as directly lighting up a screen, sliding to unlock, and double-tapping to unlock, and the first mode may further include displaying an owner interface, an owner contacts list, an owner application program, and the like on a display screen. The second mode includes a secure unlocking manner such as password unlocking, fingerprint unlocking, and face recognition unlocking, and the second mode may further include displaying a guest interface, a guest contacts list, a guest application program, and the like on the display screen. It can be understood that a difference between different modes may include only a difference in a single item; for example, a difference between the first mode and the second mode lies only in a difference in an unlocking manner, or a difference between the first mode and the second mode lies only in a difference in a startup interface. A difference between different modes may also include differences in multiple items, for example, unlocking manners, startup interfaces, contacts lists, and the like in the first mode and the second mode are all different.

S02. Pair the terminal with a wearable device.

Optionally, a wearable device may be paired with the terminal in a wired, Bluetooth, WIFI, or NFC manner.

Optionally, during pairing, a communication management module of the terminal initiates a device search periodically or aperiodically. After the terminal finds a to-be-paired wearable device, the wearable device sends out a pairing request, and the terminal receives and then responds to the request. A requesting and responding process may include a process such as authentication or acknowledgment. When responding is completed, the terminal saves pairing information, and saves information about a successfully paired wearable device to a storage and processing module of the terminal, and the wearable device and the terminal are successfully paired.

It can be understood that, if multiple wearable devices need to be paired with the terminal, the foregoing process needs to be repeated for multiple times. The foregoing pairing manner is well known by a person skilled in the art, and a specific solution and another transformation manner are not described herein again.

Optionally, a pattern, text, and the like of a pairing status is displayed on a display screen of the terminal or the wearable device; or the terminal or the wearable device notifies, in a manner of voice, vibration, and the like, a user of information about a paired status.

S03. Separately set a corresponding mode according to a different connection status between the wearable device and the terminal, and save a result of the setting to configuration information.

Figure 4:
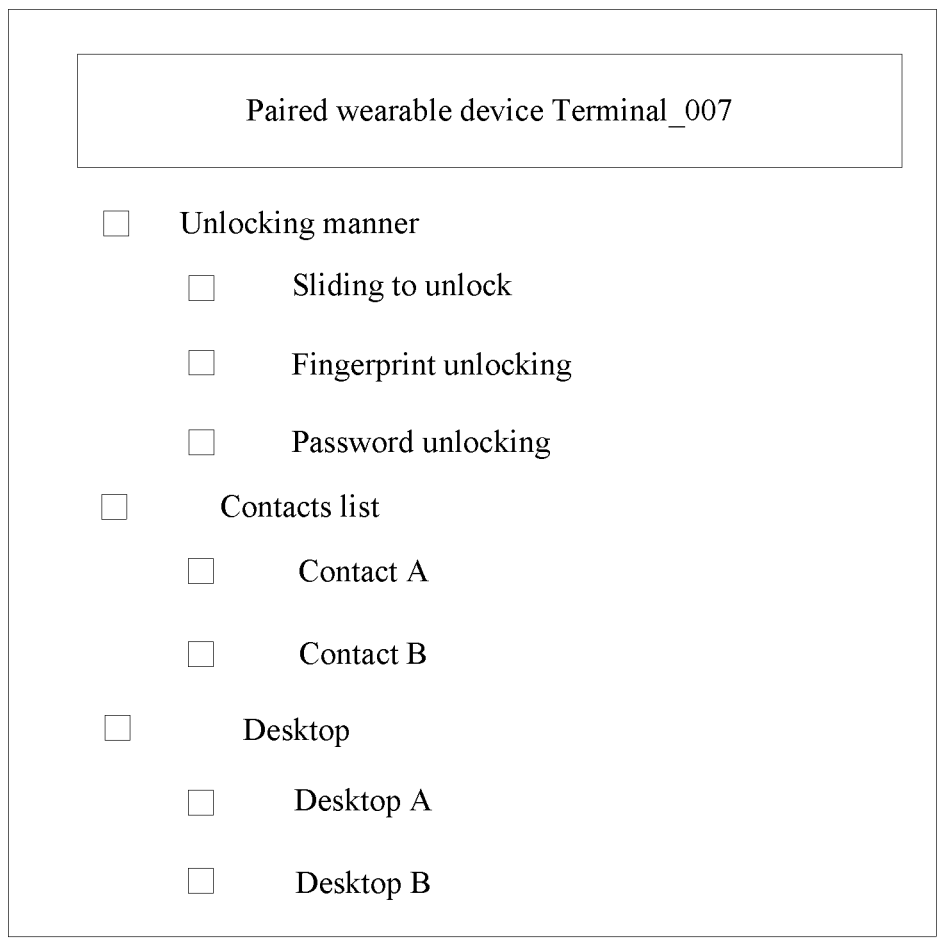
FIG. 4 is a schematic diagram of an interface for selecting a terminal mode according to an embodiment of the present invention.

Optionally, an option for selecting a mode of the terminal according to a connection status between the terminal and a wearable device is provided on the display screen of the terminal for selection by the user; for example, when a wearable device whose name is Terminal_007 completes pairing with the terminal, an option box pops up on the display screen of the terminal, and the option box may be displayed in a multi-level directory manner (referring to FIG. 4). A first-level directory includes mode content (such as an unlocking manner, a desktop, a contacts list, and an application program). A second-level directory provides an option of the first-level directory; for example, an unlocking manner includes sliding to unlock, password unlocking, and the like, and the user may select mode content of the paired wearable device as required. For example, when a first wearable device and the terminal is in a connected state, a first mode is set, and the first mode includes a combination of sliding to unlock, a contact A, and a desktop A. When a second wearable device and the terminal is in a connected state, a second mode is set, and the second mode includes a combination of fingerprint unlocking, a contact B, and a desktop B. When no wearable device establishes a connection to the terminal, a third mode is set, and the third mode includes a combination of password unlocking and the desktop A. The terminal saves the foregoing mode setting results corresponding to each wearable device to the configuration information in the storage and processing module; and the setting is complete. It should be noted that, first, second, and third herein are only used to differentiate different modes, and are not limited by another first mode and second mode in the context.

Figure 5:
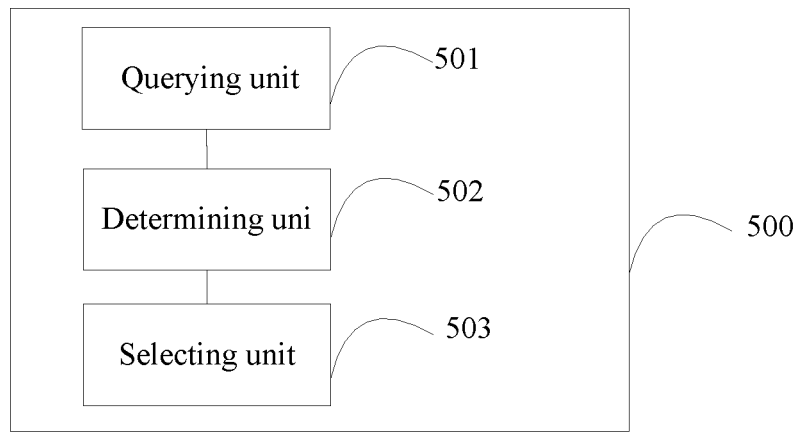
FIG. 5 is a block diagram of an apparatus for selecting a terminal mode according to an embodiment of the present invention.
Figure 6:
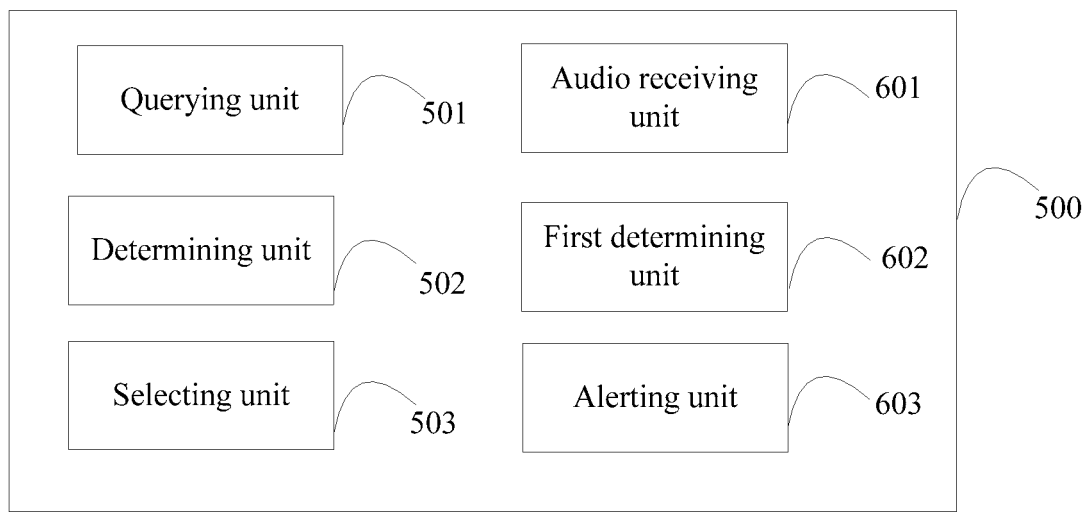
FIG. 6 is a block diagram of an apparatus for selecting a terminal mode according to an embodiment of the present invention.

The following introduces an apparatus for selecting a terminal mode provided in an embodiment of the present invention with reference to FIG. 5 and FIG. 6. The following apparatus for selecting a terminal mode may be applied to the foregoing methods; therefore, repeated content is not described herein again.

FIG. 5 is a block diagram of an apparatus for selecting a terminal mode according to an embodiment of the present invention.

An apparatus 500 for selecting a terminal mode includes: a querying unit 501, configured to query whether a wearable device is connected to a terminal; a determining unit 502, configured to determine whether the wearable device that is connected to the terminal as determined by the querying is the same as a paired wearable device; and a selecting unit 503, configured to select a first mode as the terminal model when the wearable device that is connected to the terminal as determined by the querying is the same as the paired wearable device, and select a second mode as the terminal model when the wearable device that is connected to the terminal as determined by the querying is different from the paired wearable device.

Optionally, the first mode includes any one the following unlocking manners: sliding to unlock, double-tapping to unlock, and direct unlocking.

Optionally, the first mode includes at least one piece of the following content: an owner interface, an owner desktop, and an owner contacts list.

Optionally, the second mode includes one of complex unlocking manners, such as fingerprint unlocking, password unlocking, iris unlocking, graph and pattern unlocking, face unlocking, PIN unlocking, voice unlocking, sound wave unlocking, and gesture unlocking, so as to improve security of the terminal. Alternatively, a complex unlocking manner may not be used and the second mode includes only a part of an address book, a part of a historical chat record, a part of application programs, or the like. Alternatively, transmitting alert information is included in the second mode, where the alert information includes transmitting an alert sound, or sending information about the terminal to a specific object, where the specific object includes a mobile phone, an email box, and a social account of the terminal user or another user; and the information about the terminal includes a position and a status of the terminal.

Optionally, referring to FIG. 6, the terminal further includes: an audio receiving unit 601, configured to acquire a sound signal transmitted by a wearable device; a first determining unit 602, configured to determine whether the acquired sound signal meets a set condition; and an alerting unit 603, configured to transmit alert information when the audio receiving unit cannot receive a sound signal transmitted by a paired wearable device.

Optionally, the sound signal may be a voice, an ultrasonic wave, an audio file, and the like.

Optionally, the set condition includes that the acquired sound signal is the same as a signal saved in the terminal, or a conformity degree between information such as a frequency or an amplitude of the acquired sound signal and that of the signal saved in the terminal is above 50% or 90% or any set value.

Optionally, the alert information includes transmitting an alert sound, or sending a status and a position of the terminal to another mobile phone of the owner or an email box of the owner.

By using the apparatus provided in this embodiment of the present invention, it is queried whether a paired wearable device that is connected to a terminal exists, and then a corresponding mode is automatically selected, which reduces a step of manual selection by a user and is favorable for improving a user experience effect. Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for selecting a terminal mode, wherein the method comprises:
   querying, by a terminal, to determine whether a wearable device is connected to the terminal;
   determining, by a terminal, whether the wearable device that is connected to the terminal as determined by the querying is the same as a paired wearable device;
   selecting, by a terminal, a first mode as the terminal mode when the wearable device is determined to be the same as the paired wearable device, wherein the first mode comprises a first unlocking manner;
   when the wearable device is determined to be different from the paired wearable device:
   selecting, by a terminal, a second mode as the terminal mode, wherein the second mode comprises a second unlocking manner which is more complicated than the first unlocking manner,
   acquiring, by the terminal, a sound signal transmitted by the wearable device,
   determining, by a terminal, whether the sound signal meets a preset condition, and
   transmitting, by the terminal, alert information when the preset condition is not met.

2. The method according to claim 1, wherein the first mode comprises any one the following unlocking manners: sliding to unlock, double-tapping to unlock, and direct unlocking; and
   the second mode comprises any one the following unlocking manners: fingerprint unlocking, password unlocking, iris unlocking, graph and pattern unlocking, face unlocking, PIN unlocking, voice unlocking, sound wave unlocking, and gesture unlocking.

3. The method according to claim 1, wherein the first mode comprises at least one of an owner interface, an owner desktop, or an owner contacts list; and
the second mode comprises at least one of a guest interface, a guest desktop, or a guest contacts list.

4. The method according to claim 1, wherein transmitting the alert information comprises transmitting an alert sound, or information about the terminal to a specific object, wherein the specific object comprises a mobile phone, an email box, or a social account of a terminal user or another user; and the information about the terminal comprises a position or a status of the terminal.

5. The method according to claim 1, wherein a connection for connecting the wearable device to the terminal comprises any connection manner of a Bluetooth connection, a WiFi connection, or an NFC connection.

6. An apparatus for selecting a terminal mode, wherein the apparatus comprises:
a hardware processor: and
a computer-readable storage medium storing a program to be executed by the processor, the program including instructions for
querying to determine whether a wearable device is connected to a terminal;
determining whether the wearable device that is connected to the terminal as determined by the querying is the same as a paired wearable device;
selecting a first mode as the terminal mode when the wearable device is determined to be the same as the paired wearable device, wherein the first mode comprises a first unlocking manner,
when the wearable device is determined to be different from the paired wearable device:
select a second mode as the terminal mode, wherein the second mode comprises a second unlocking manner which is more complicated than the first unlocking manner;
acquiring a sound signal transmitted by the wearable device;
determining whether the acquired sound signal meets a preset condition; and
transmitting alert information when the sound signal does not meet the preset condition.

7. The apparatus according to claim 6, wherein:
the first mode comprises any one the following unlocking manners: sliding to unlock, double-tapping to unlock, and direct unlocking; and
the second mode comprises one the following unlocking manners: fingerprint unlocking, password unlocking, iris unlocking, graph and pattern unlocking, face unlocking, PIN unlocking, voice unlocking, sound wave unlocking, and gesture unlocking.

8. The apparatus according to claim 6, wherein:
the first mode comprises any one of an owner interface, an owner desktop, and an owner contacts list; and
the second mode comprises any one of a guest interface, a guest desktop, and a guest contacts list.

9. The method according to claim 1, wherein the querying step is executed when the terminal receives a screen wakeup instruction, wherein the screen wakeup instruction is configured to wake up a screen of the terminal.

10. The apparatus according to claim 6, wherein the terminal is connected to the wearable device through Bluetooth, Wi-Fi, or NFC.

11. The apparatus according to claim 6, wherein the instructions cause the apparatus to execute the querying step at an interval during the terminal in state of hibernation.

12. The apparatus according to claim 11, wherein the interval is 1 second.

13. The apparatus according to claim 6, wherein the instructions cause the apparatus to execute the querying step when the terminal receives a screen wakeup instruction, wherein the screen wakeup instruction is configured to wake up a screen of the terminal.

14. The apparatus according to claim 6, wherein the instructions cause the apparatus to display a pattern or a text of a querying result on a display screen.

15. The apparatus according to claim 6, wherein the instructions cause the apparatus to notify a querying result through a voice manner.

16. A non-transitory computer-readable storage medium storing a program which, when executed by a terminal, causes the terminal to carry out:
querying to determine whether a wearable device is connected to a terminal;
determining whether the wearable device that is connected to the terminal as determined by the querying is the same as a paired wearable device;
selecting a first mode as a terminal mode when the wearable device is determined to be the same as the paired wearable device, wherein the first mode comprises a first unlocking manner;
selecting a second mode as the terminal mode when the wearable device is determined to be different from the paired wearable device, wherein the second mode comprises a second unlocking manner which is more complicated than the first unlocking manner;
acquiring a sound signal transmitted by the wearable device;
determining whether the acquired sound signal meets a preset condition; and
transmitting alert information when the sound signal does not meet the preset condition.

17. The non-transitory computer-readable storage medium according to claim 16, wherein:
the first mode comprises any one the following unlocking manners: sliding to unlock, double-tapping to unlock, and direct unlocking; and
the second mode comprises one the following unlocking manners: fingerprint unlocking, password unlocking, iris unlocking, graph and pattern unlocking, face unlocking, PIN unlocking, voice unlocking, sound wave unlocking, and gesture unlocking.

18. The non-transitory computer-readable storage medium according to claim 16, wherein the querying step is executed when the terminal receives a screen wakeup instruction, wherein the screen wakeup instruction is configured to wake up a screen of the terminal.

19. The non-transitory computer-readable storage medium according to claim 16, wherein the program causes the terminal to execute the querying step at an interval during the terminal in state of hibernation.

20. The non-transitory computer-readable storage medium according to claim 16, wherein the program causes the terminal to execute the querying step when the terminal receives a screen wakeup instruction, wherein the screen wakeup instruction is configured to wake up a screen of the terminal.

21. The non-transitory computer-readable storage medium according to claim 16, wherein the program causes the terminal to notify a querying result through a voice manner.

* * * * *